United States Patent [19]

Fushimoto

[11] Patent Number: 5,655,128
[45] Date of Patent: Aug. 5, 1997

[54] ELECTRONIC DICTIONARY

[75] Inventor: Hideo Fushimoto, Tokyo, Japan

[73] Assignee: Canon Kabushiki Kaisha, Tokyo, Japan

[21] Appl. No.: 383,695

[22] Filed: Feb. 1, 1995

Related U.S. Application Data

[63] Continuation of Ser. No. 19,877, Feb. 19, 1993, abandoned.

[30] Foreign Application Priority Data

Feb. 20, 1992 [JP] Japan .................................. 4-070203

[51] Int. Cl.⁶ .................................................. G06F 17/28
[52] U.S. Cl. ........................ 395/760; 395/754; 395/794
[58] Field of Search .......................... 364/419.11, 419.02, 364/200 MS, 300; 395/754, 760, 794

[56] References Cited

U.S. PATENT DOCUMENTS

| | | | |
|---|---|---|---|
| 4,599,612 | 7/1986 | Kaji et al. | 364/419.02 |
| 4,774,666 | 9/1988 | Miyao et al. | 364/419.02 |
| 4,980,829 | 12/1990 | Okajima et al. | 364/419 |
| 5,063,534 | 11/1991 | Kishimoto | 364/419 |

FOREIGN PATENT DOCUMENTS

| | | | |
|---|---|---|---|
| 61156462 | 12/1986 | Japan . | |
| 01298464 | 2/1990 | Japan . | |
| 03109672 | 8/1991 | Japan | 364/419 |
| 3-202951 | 9/1991 | Japan . | |
| 03202951 | 9/1991 | Japan | 364/419 |
| 02106116 | 4/1992 | Japan . | |
| 5-120326 | 5/1993 | Japan . | |
| 6-96280 | 4/1994 | Japan . | |

*Primary Examiner*—Gail O. Hayes
*Assistant Examiner*—Frantzy Poinvil
*Attorney, Agent, or Firm*—Fitzpatrick, Cella, Harper & Scinto

[57] ABSTRACT

An electronic dictionary includes a central processing unit which performs retrieval of a first language information and then stores the first language information in a history area. When the first language information and the corresponding second language information are selected and displayed on a display device and the first language information is retrieved, the first language information can be registered in a word memo area by specifying the information read out from history area while taking advantage of a history function, whereby an operator can store desired language information in a memory device without reducing the efficiency of retrieval operations.

10 Claims, 15 Drawing Sheets

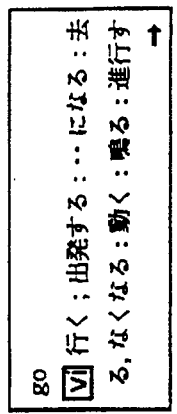
FIG.5E
FIG.5F
FIG.5G
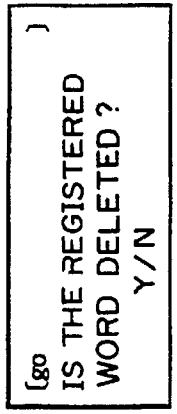
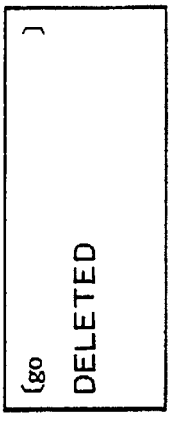
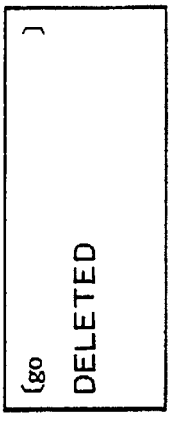
FIG.5A
FIG.5B
FIG.5C
FIG.5D
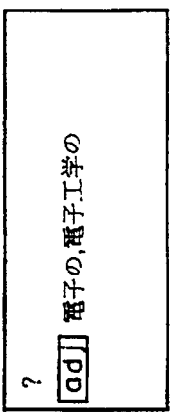
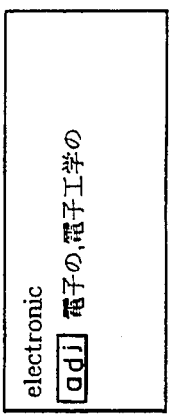

[D]

| [D] | electronic | [20] |
|---|---|---|
| [E] | patent | |
| [F] | memory | |
| [G] | wright | ↑↓ |

| [D] | electronic | [21] |
|---|---|---|
| [E] | patent | |
| [F] | memory | |
| [G] | wright | ↑↓ |

FIG.14B

ELECTRONIC DICTIONARY

This application is a continuation of application Ser. No. 08/019,877 filed Feb. 19, 1993, now abandoned.

BACKGROUND OF THE INVENTION

1. Field of the Invention

The present invention relates to an electronic dictionary provided with a learning function.

2. Description of the Prior Art

If an English word is inputted into an electronic dictionary, for instance, an electronic dictionary provided with an English-Japanese dictionary, the electronic dictionary outputs the Japanese word corresponding to the inputted English word, while if an English composition is inputted thereto, it outputs the Japanese composition corresponding to the inputted English composition.

This electronic dictionary provided with an English-Japanese dictionary is designed such that, when an English word is, for instance, inputted to this electronic dictionary, the dictionary retrieves the inputted English word from the memory which stores the English-Japanese dictionary, reads out or outputs the Japanese word corresponding to the retrieved English word and mainly displays the Japanese word on a display device such as a liquid crystal display device or outputs it through audio response or a printer.

Among these electronic dictionaries having such structure, there have been proposed those which are mainly used for the study of English and which are designed so that information such as retrieved English words are selectively stored in a memory means and that an operator can efficiently study English by repeatedly reading out and outputting the information from the memory means.

If an operator stores information such as retrieved English words in the memory means of such a conventional English-Japanese electronic dictionary, the operator must first input, for instance, an English word. The electronic dictionary correspondingly retrieves the inputted English word from the memory and then reads out the Japanese word corresponding to the retrieved English word. Then it outputs the retrieved result on a display device and the information read out is stored in the memory means through a desired instruction means. In this case, it is needed to store the information each time a retrieval operation is performed through a desired instruction means.

Therefore, if the operator performs retrieval operations, but forgets to store or fails in the storage of the retrieved information in the memory means, he must repeat troublesome procedures, i.e., he must again perform the retrieval operation and the storage operation. Moreover, the operator is confronted with accidents that superfluous information is stored and this leads to the storage of unnecessary information in the memory means. To eliminate this problem, there has been proposed a method which comprises the steps of discriminating whether the same information is already stored or not during the storage operation and displaying a message that the information to be stored has already been stored on a display device. However, the discrimination operation and the display of the message require extra processing time and this leads to a substantial reduction of operational efficiency.

In addition, the conventional electronic dictionaries are not equipped with a means for confirming which information among a plurality of information read out through a series of retrieval operations is stored. In order to perform the foregoing confirmation operation, it is, therefore, necessary to again retrieve necessary information and to perform a storage operation to thus make the electronic dictionary display a message that the storage thereof is duplicated. As a result, the conventional electronic dictionaries have low retrieval efficiency and require extra operations of a driving device which leads to consumption of too much electric power.

SUMMARY OF THE INVENTION

Accordingly, an object of the present invention is to provide an electronic dictionary which permits the solution of the foregoing problems associated with the conventional electronic dictionaries and which allows the storage of language information necessary for an operator in a memory means without any reduction in the efficiency of retrieval operations.

According to a first aspect of the present invention, the foregoing object can effectively be accomplished by providing an electronic dictionary which comprises:

first memory means for storing a dictionary consisting of first language information and second language information corresponding to the first language information:

input means for inputting language information;

means for retrieving the language information inputted as the first language through the input means from a first group of language information which is in correspondence to the second language information and stored in the first memory means;

second memory means for storing the first language information retrieved by the retrieval means;

third memory means for selectively storing the retrieved first language information; and control means for selecting the first language information stored in the second memory means and for storing the selected first language information in the third memory means.

In this regard, if the electronic dictionary is, for instance, an English-Japanese electronic dictionary, the first language information corresponds to Japanese words, the second language information corresponds to the corresponding English equivalents (translated English words), the first memory means is an English-Japanese dictionary and the second memory means corresponds to a study dictionary.

According to a second aspect of the present invention, there is provided an electronic dictionary comprising the elements used in the first aspect wherein the electronic dictionary is provided with means for preventing double-registration capable of displaying, on display means, a message that the storage of the retrieved first language information is duplicative, when the retrieved first language information which has already been stored in the third memory means is again intended to be stored therein.

According to a third aspect of the present invention, there is, provided an electronic dictionary having elements used in the first aspect wherein, when storing the first language information inputted through the input means in the second and third memory means, positional information for the first memory means is stored which is in correspondence with the inputted first language information.

According to a fourth aspect of the present invention, there is provided an electronic dictionary having the same elements used in the first aspect wherein the electronic dictionary further comprises display-control means for counting the quantity of the first language information stored in the third memory means and for displaying the result on a display means when selecting the first language information stored in the second memory means and storing the same in the third memory means.

In the electronic dictionary having the foregoing structure according to the present invention, retrieval means retrieves the first language information and the second language information in correspondence thereto on the basis of the language information inputted to the electronic dictionary through the input means and the result of the retrieval is displayed on the display means. The retrieved first language information is stored in the second memory means each time a retrieval operation is performed and a plurality of retrieved first language information stored in the second memory means are displayed on the display means. The control means selectively stores the plurality of language information thus displayed and outputted in the third memory means.

After a series of retrieval operations, a plurality of retrieved first language information are thus outputted and displayed. Therefore, the operator can selectively specify only necessary information among the plurality of retrieved first language information and store the information in the third memory means. For this reason, it is not necessary for the operator to perform a retrieval operation each time the retrieved information is stored in the third memory means, i.e., the operator can collectively store only the necessary information selected from the plurality of information in the third memory means. This eliminates the need for repeating the retrieval operation which is needed when the operator fails in storing the necessary information and eliminates the need for an extra operation due to any double registration. Thus, the electronic dictionary of the present invention greatly improves the-retrieval efficiency.

The above and other objects, effects, features and advantages of the present invention will become more apparent from the following description of embodiments thereof taken in conjunction with the accompanying drawings.

BRIEF DESCRIPTION OF THE DRAWINGS

FIG. 5A is a plan view showing the display surface observed when a word memo menu is selected from the electronic dictionary;

FIG. 5B is a plan view showing the display surface observed when the equivalent for the inputted word is selected from the foregoing word memo menu;

FIG. 5C is a plan view showing the display surface on which the English word corresponding to the Japanese translation is displayed;

FIG. 5D is a plan view showing the display surface observed when the next Japanese equivalent for the inputted English word is selected from the foregoing word memo menu;

FIG. 5E is a plan view showing the display surface on which the entire information concerning a certain English word in the foregoing word memo menu is displayed;

FIG. 5F is a plan view showing the display surface observed when instructing the deletion from the foregoing information of the word memo menu;

FIG. 5G is a plan view showing the display surface observed after completion of the foregoing deletion;

FIG. 14A is a plan view of the display surface in which the number of the registration order of the registered keyword is displayed on the screen in the word memo mode in a third embodiment according to the present invention;

FIG. 14B is a plan view of the display surface observed when a registered keyword next to the foregoing registered word is selected.

DESCRIPTION OF THE PREFERRED EMBODIMENTS

Embodiment 1

Figure 1:
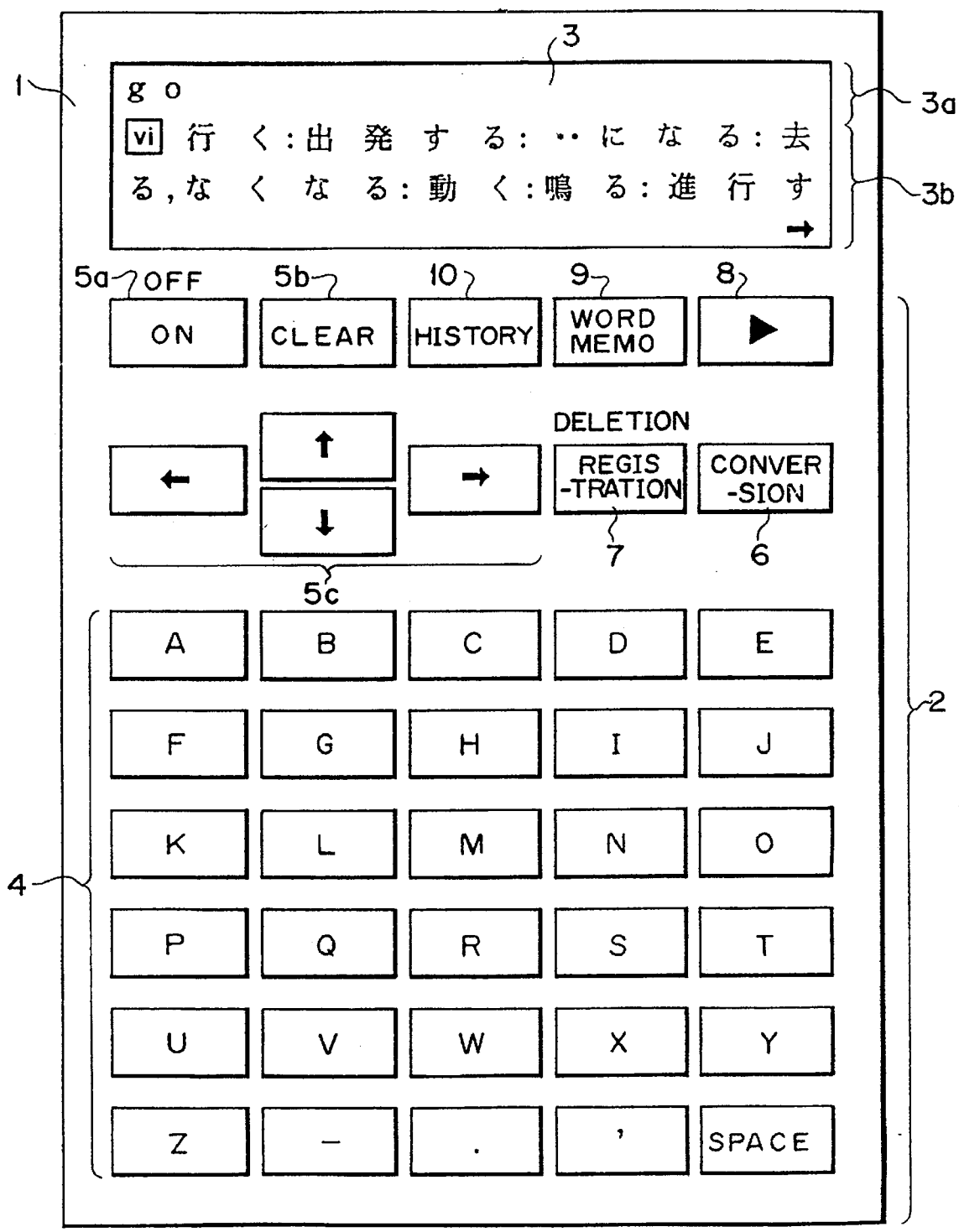
FIG. 1 is a plan view showing the appearance of an embodiment of the electronic dictionary according to the present invention.

FIG. 1 is a plan view showing the appearance of an embodiment of the English-Japanese electronic dictionary 1 according to the present invention.

The electronic dictionary according to this Embodiment comprises a keyboard part 2 and a display device 3 for displaying, for instance, an English word and the Japanese equivalent thereof. This keyboard part 2 comprises letter-input keys 4 on which letter keys are arranged in the form of a 6×5 matrix, a power on/off key 5a, a clear key 5b for instructing the deletion of data displayed, a cursor key 5c for moving a cursor on the surface of display device 3 and for switching the display screen, a conversion key 6 for instructing the translation of the inputted English word into Japanese, a registration/deletion key 7 for instructing the storage of retrieved information in a word memo area 13c in an RAM 13 as will be detailed below, a NEXT key 8 for instructing the read out of the information stored next to the retrieved information, a word memo key 9 for establishing a mode in which the information stored in the foregoing word memo area 13c is displayed on display device 3 and a history key 10 for displaying all of the retrieved English words on display device 3.

Figure 2:
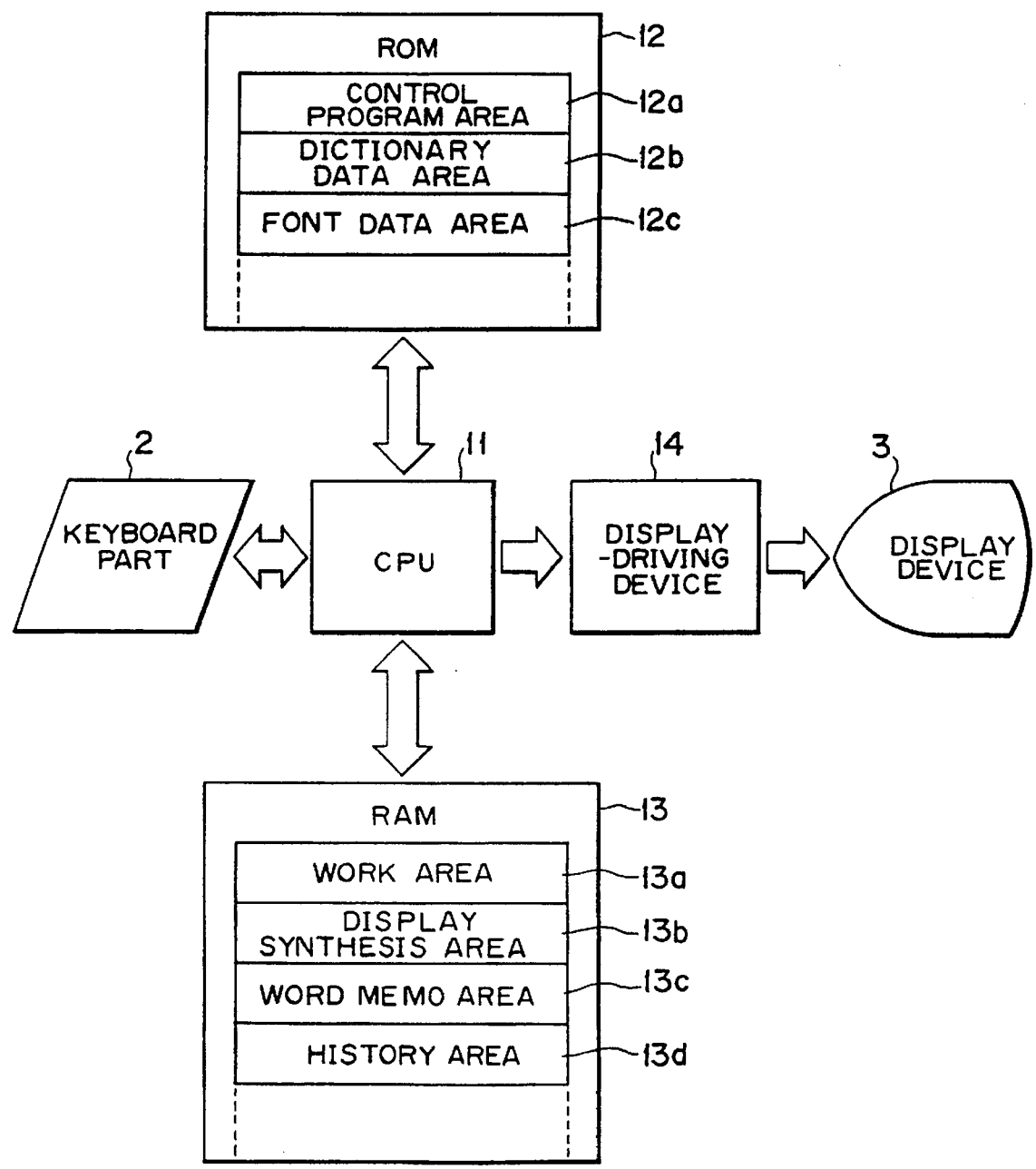
FIG. 2 is a schematic block diagram showing the basic structure of the electronic dictionary shown in FIG. 1.

FIG. 2 is a schematic block diagram showing the circuit structure of a control circuit of the electronic dictionary described above. This control circuit comprises the foregoing keyboard part 2, the aforementioned display device 3, a CPU 11 for controlling the overall apparatus by executing a control program as will described below, a ROM 12, the aforementioned RAM 13 and a display-driving device 14 for operating display device 3. ROM 12 comprises a control program area 12a, a dictionary data area 12b and a font data area 12c. RAM 13 is composed of a work area 13a, a display synthesis area 13b, a word memo area 13c and a history area 13d.

CPU 11 performs retrieval of the English word corresponding to a set of alphabets inputted through keyboard part 2 from a dictionary stored in dictionary data area 12b when an instruction to perform retrieval is inputted thereto through conversion key 6.

There are stored, in control program area 12a of ROM 12, control programs such as a program for retrieval describing control procedure depicted in FIG. 4, 6, 7, 10, 11, 13 and 15 which is executing by CPU 11 and a program for converting information such as data retrieved from the dictionary into font data. In addition, there are stored, in dictionary data area 12b, a dictionary comprising English words and the corresponding translated Japanese words. Further there is stored, in font data area 12c, font data composed of various kinds of characters to be displayed on display device 3.

Arithmetic data processed by CPU 11 are temporarily stored in work area 13a of RAM 13, information such as retrieved information, information inputted through keyboard part 2 and various kinds of messages are converted into patterns to be synthesized into data through the use of the foregoing font data and the resulting data is stored in display synthesis area 13b, word memo area 13c stores address information of dictionary data area 12b for again reading out retrieved English words in order to selectively display the retrieved English words and the corresponding translated Japanese words on display device 3 and history area 13d temporarily stores whole of the retrieved English words.

The aforementioned display-driving device 14 comprises display memory receiving contents of display synthesis area 13b in order to control the display device 3 in such a manner that various kinds of information synthesized in display synthesis area 13b are displayed on display device 3, and control circuit displaying the contents. The display area of display device 3 comprises areas 3a and 3b as shown in FIG. 1, the inputted English words are displayed on area 3a and there are displayed, on area 3b, information such as the retrieved Japanese words, parts of speech thereof and illustrative sentences.

The display device permits arbitrary display of information other than the dictionary information on the combined areas 3a and 3b.

Figure 3A:
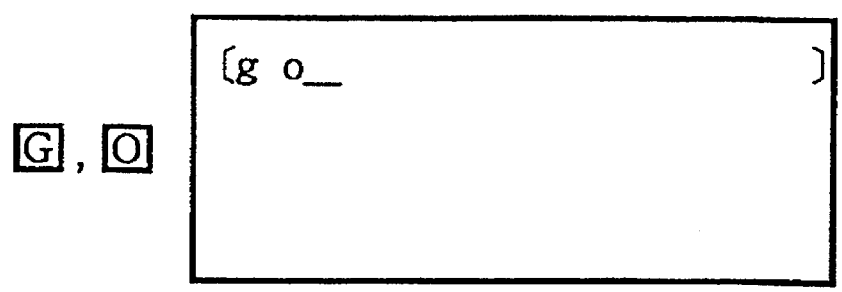
FIG. 3A is a plan view of the display surface (or the screen) of a display device observed when an English word is inputted to the foregoing electronic dictionary for the purpose of registration.
Figure 3B:
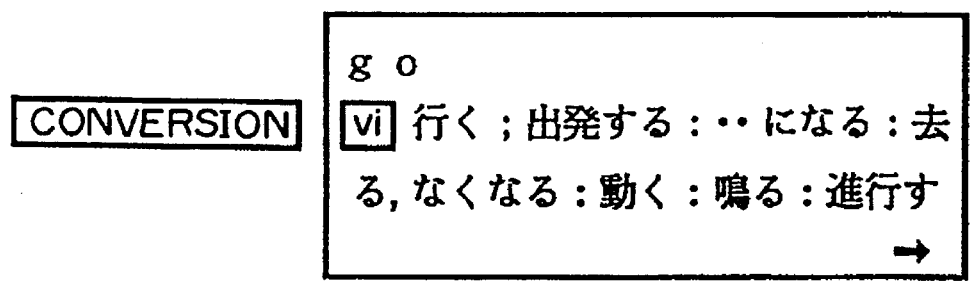
FIG. 3B is a plan view of the display surface of the display device on which a Japanese translation of the English word inputted for registration is displayed.
Figure 3C:
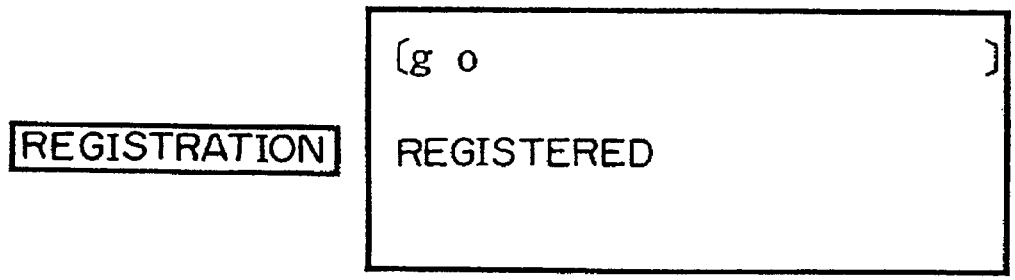
FIG. 3C is a plan view showing the display surface of the display device observed after the inputted English word and the Japanese translation thereof are registered.
Figure 4:
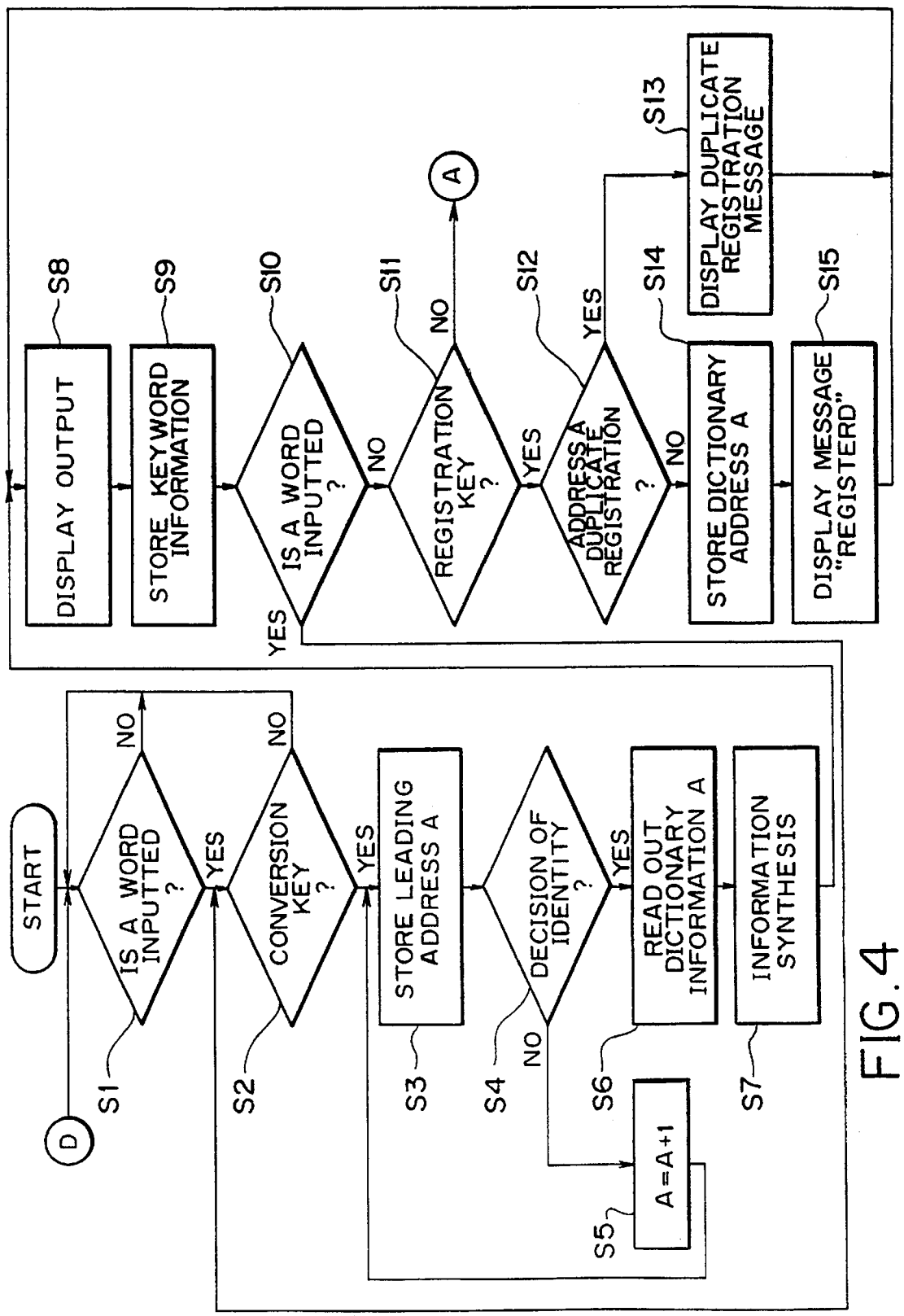
FIG. 4 is a flow chart illustrating control procedures required for the dictionary retrieval and word memo-registration operations of the foregoing electronic dictionary.

Then the control procedures required for dictionary retrieval and word memo registration operations will hereinafter be explained on the basis of display examples shown in FIGS. 3A, 3B and 3C as well as the flow chart showing the control procedures performed by CPU 11 as shown in FIG. 4.

As shown in FIG. 3A, if an English word "go" is inputted through letter-input keys 4, the inputted letters "go" are displayed on area 3a of display device 3. Then conversion key 6 is operated (pushed), the electronic dictionary carries out retrieval operation and the Japanese translation of the English word "go" is displayed on the display surface (or screen) as shown in FIG. 3B. At this stage, if the word "go" is registered in the word memo, a push of registration key 7 starts storage of the dictionary address for the word "go" in word memo area 13c of RAM 13, simultaneously a message that the registration is completed ("Registered") as shown in FIG. 3C is displayed on the screen over a predetermined period of time and thereafter the screen is switched to that in the retrieval mode shown in FIG. 3B.

The foregoing operations, namely the control executed by CPU 11, will be further detailed below with reference to the flow chart shown in FIG. 4.

At step S1, the electronic dictionary is in the stand-by state until an English word is inputted through the operation of letter input keys 4 and if an English word is inputted, it is decided, at step S2, whether conversion key 6 is operated or not. If conversion key 6 is operated, the operation proceeds to step S3 wherein the leading address A of dictionary data area 12b to be retrieved is determined on the basis of the leading character of the inputted English word and words are in order read out from the address A. At step S4, the word read out is compared with the inputted word to decide whether they are in conformity with one another or not. If they are not in conformity with one another, the operation proceeds to step S5 wherein the increment of the read-out address A in dictionary data area 12b is performed and then comes back to step S3.

If it is decided, in step 4, that these words are in agreement with one another, data of translated Japanese words subsequent to the keyword in dictionary data area 12b are read out in step S6 and the data of translated Japanese words are synthesized at step S7 by character data read out from font data area 12c according to the data read out from dictionary data area 12b in display synthesis area 13b of RAM 13 according to a predetermined format. Then the synthesized data are displayed on display device 3 at step S8 through display driving device 14 and simultaneously the retrieved keyword information is, at step S9, stored in history area 13d in RAM 13 to thus complete a series of retrieval operations. At step S10, the electronic dictionary is in the stand-by state until a subsequent English word to be retrieved is inputted.

At step S10, if any English word is not inputted, it is decided, at step S11, whether registration key 7 is operated or not. As a result, if there is no operation of registration key 7, the operation proceeds to control procedures [A] and those subsequent thereto as will be detailed below.

At step S11, if it is decided that registration key 7 is operated, the address A for retrieved English words in dictionary data area 12b is compared, at step S12, with a plurality of addresses which specify corresponding English words in dictionary data area 12b which have already been stored in word memo area 13c to determine whether they are in agreement with one another or not. If they are in conformity with one another, a message that the registration is duplicative is displayed at step S13 on display device 3 to interrupt the registration, whereby the operation returns to step S8 (the screen displaying the results of retrieval).

If it is decided, at step S12, that the word to be registered is not agreement with any word already registered, the operation proceeds to a step S14 wherein an address value A indicative of an address of the retrieved English word in dictionary data area 12b is stored in word memo area 13c in RAM 13. Then a message of the completion of the registration is outputted on display device 3 at step S15 and the procedure returns to step S8 (the screen displaying the results of retrieval). The control procedures detailed above are repeated to practice the dictionary retrieval and the registration of retrieved words in the word memo area.

Then the word memo function principally used for leaning will be detailed below while making reference to FIGS. 5A to 5G, FIG. 6 and FIG. 7. First, word memo key 9 is operated to display the word memo menu on the screen as shown in FIG. 5A. The word memo menu comprises three modes capable of being freely selected. More specifically, the upper two modes can effectively be selected by an operator depending on subjects to be learned when the operator learns English. In the uppermost mode, an English word as a keyword is first displayed and then whole information inclusive of the corresponding translated Japanese words (Japanese equivalents) are displayed when reading out the registered data, while in the second mode, the corresponding translated Japanese word(s) is first displayed and then whole information inclusive of the English word as the keyword are displayed. In the final mode, the whole data registered in the word memo are collectively deleted.

If the item B, i.e., "Equivalent" among the items shown in FIG. 5A is selected, only the equivalents among the dictionary data are displayed according to the order of registration as shown in FIG. 5B so that the operator can give an answer, i.e., the corresponding English equivalent. Then NEXT key 8 is operated to synthesize and display the English equivalent "electronic" corresponding to the Japanese words shown in FIG. 5B (FIG. 5C). Thus, the operator can confirm correctness of the answer. Thereafter, NEXT key 8 is again operated to display subsequently registered information, equivalents, as shown in FIG. 5D and then NEXT key 8 is further operated to display the whole information as shown in FIG. 5E. In this way, the repeated operations of NEXT key 8 permit repeated question answer operations so that the operator can perform desired study.

On the other hand, if specific information registered in the word memo area is deleted, registration/deletion key 7 is operated while displaying the whole information to be deleted (FIG. 5E) to output a deletion message (FIG. 5F). At this stage, if a Y key the operation of which means "deletion OK" is operated, the specified address in word memo area 13c is deleted, simultaneously thereto a message that the deletion has been finished is outputted (FIG. 5G) and the Japanese equivalent corresponding to subsequently stored address is displayed.

In FIG. 5A, if the item A, i.e., "keyword" is selected in contrast with the foregoing, an English word as a keyword is first outputted, the operator give a reply (or answer the Japanese equivalent thereto), then NEXT key 8 is operated to display the whole information on the screen and to thus be able to confirm the correctness of the answer. The operator can study English by repeating these operations.

The foregoing operational procedures will be detailed below with reference to the flow chart shown in FIG. 6 and FIG. 7.

Figure 6:
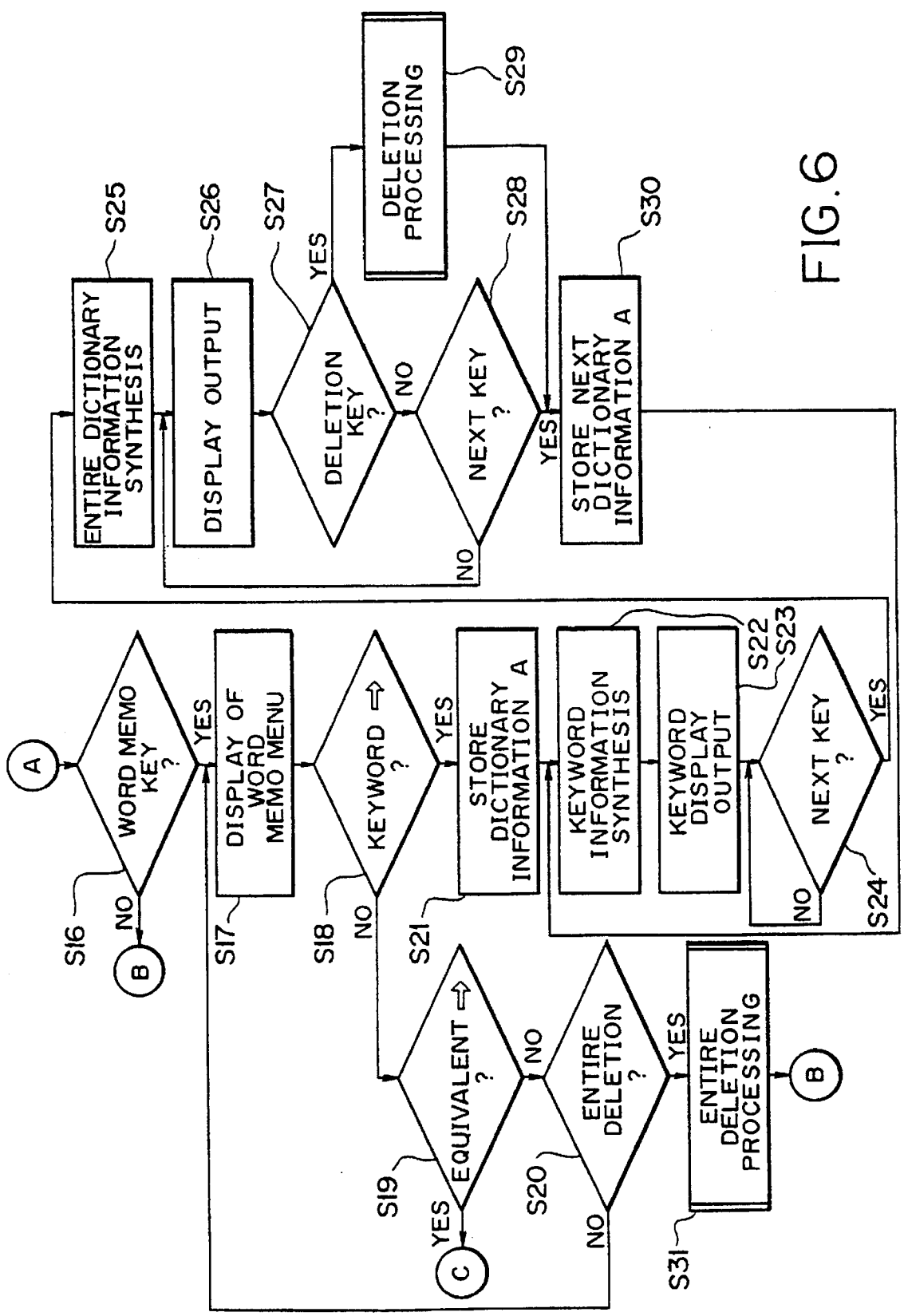
FIG. 6 is a flow chart illustrating the processing procedures for the practice of the word memo function.

When registration key 7 is not operated at step S11 shown in FIG. 4, it is confirmed, at step S16 shown in FIG. 6, whether word memo key 9 is operated or not. When word memo key 9 is not operated, the operation of this electronic dictionary proceeds to the control step [B] and those subsequent thereto as will be detailed below. When word memo key 9 is operated at step S16, the word memo menu as shown in FIG. 5A previously stored in ROM 12 is outputted on display device 3 at step S17 and the existence of each operation of mode selection key is confirmed at step S18, S19 or S20.

First of all, a case wherein the mode "keyword" is selected at step S18 will be detailed below. When the mode "keyword" is selected at step S18, a dictionary address A, which is the latest registered address is read out from the dictionary addresses stored in word memo area 13c and temporarily stored in work area 13a.

Then English word data are read out at step S22, which are keywords stored in dictionary data area 12b in conformity with address A, then patterned by font data to be synthesized in display synthesis area 13b and outputted on display device 3 at step S23.

When NEXT key 8 is operated at step S24, the information, i.e., the English words and the corresponding equivalents thereof in conformity with address A are read out from dictionary data area 12b at step S25, then patterned by font data to be synthesized in display synthesis area 13b and outputted on display device 3 at step S26. When registration/deletion key 7 is operated at this state (a step S27), address A is deleted from word memo area 13c at step S29 (the details of this deletion control is herein omitted).

When registration/deletion key 7 is not operated at step S27, it is confirmed, at step S28, whether NEXT key 8 is operated at step S28 or not. When NEXT key 8 is operated, there is read out from dictionary data area 12b and outputted keyword information corresponding to the English word address registered immediately before the registration of the presently displayed English word (a step S30) and the operation returns to step S22. On the other hand, when NEXT key 8 is not operated, the operation returns to step S26 and the present data are maintained on the screen.

Figure 7:
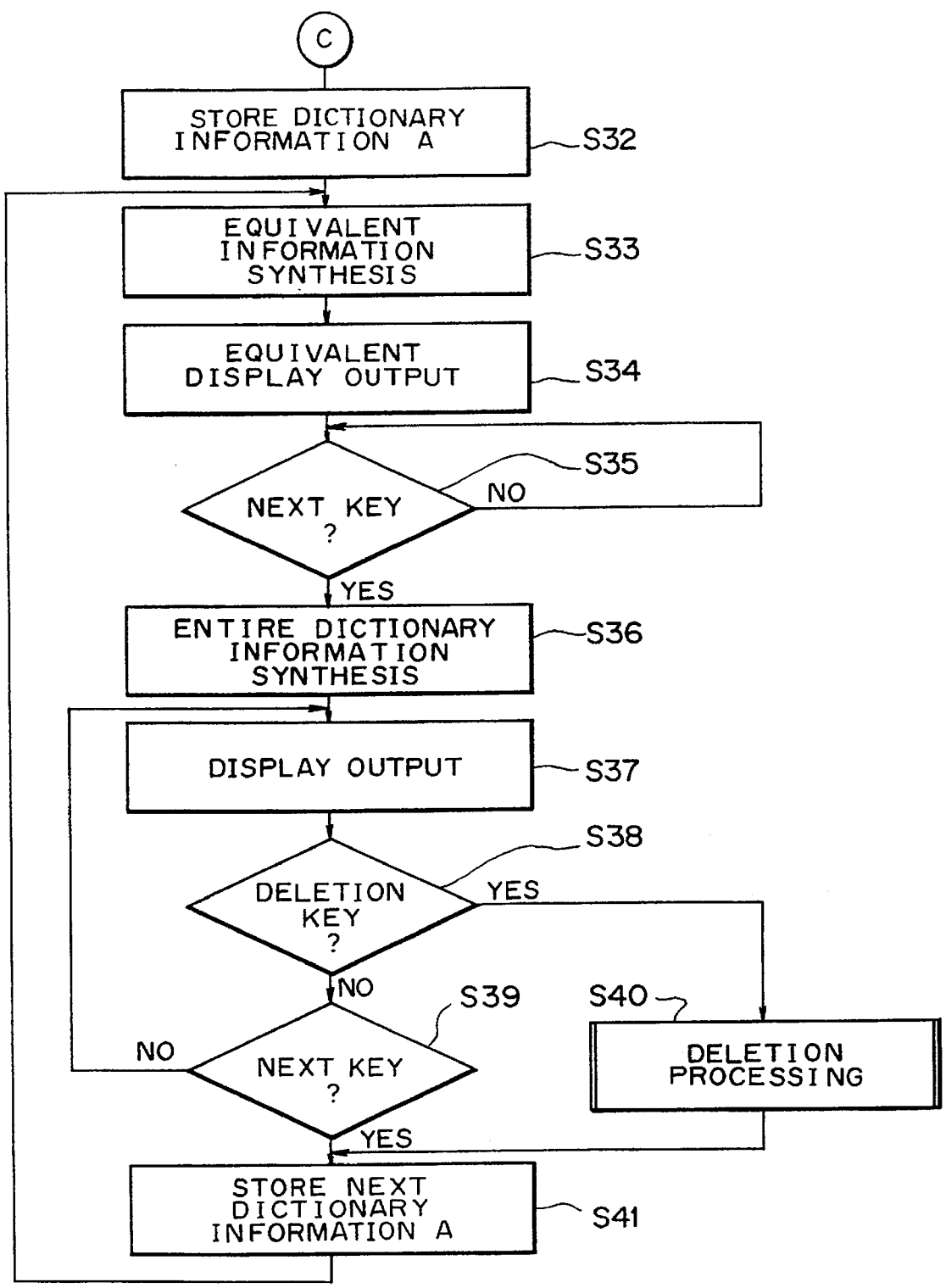
FIG. 7 is a flow chart illustrating the processing procedures for practicing the word memo function.

Then when the mode "keyword" is not selected at step S18 and the mode "equivalent" is selected at step S19, the electronic dictionary proceeds the operations from steps S32 to S41 shown in FIG. 7. In steps S21 to S30 as shown in FIG. 6, a keyword is first displayed and then the keyword and the corresponding equivalent are then displayed through the operation of NEXT key 8, while in the operations of steps S32 to S40, the equivalent is first displayed and then the keyword and the corresponding equivalent are displayed through the operation of NEXT key 8. Therefore, both processings are almost identical to one another and the details of the processing procedures for the operations in steps S32 to S40 are herein omitted.

Finally, when neither the mode "keyword" nor the mode "equivalent" is selected in steps S18 and A19 and the mode "entire deletion" is selected at step S20, the operation proceeds to step S31 to perform the entire deletion processing. In other words, the entire information registered in word memo area 13c is cleared and a message that the entire deletion is completed is outputted and displayed on the screen.

The foregoing explanation relates to the situation in which the operator imagines an answer to a question, but the learning effect can further be improved if an answer is inputted through the keyboard and then the correctness thereof is judged. Moreover, it is also possible to design the electronic dictionary such that each address registered in word memo area 13c can be randomly accessed and/or that the operator can establish the order of access. This permits further improvement of the learning effect.

A specific word included in a keyword list outputted on the screen can be selectively registered in word memo area 13c while taking advantage of the function (hereinafter referred to as "history function") that all of the keywords retrieved until a certain time are stored each time a keyword is retrieved. This control will be detailed below.

Figure 8A:
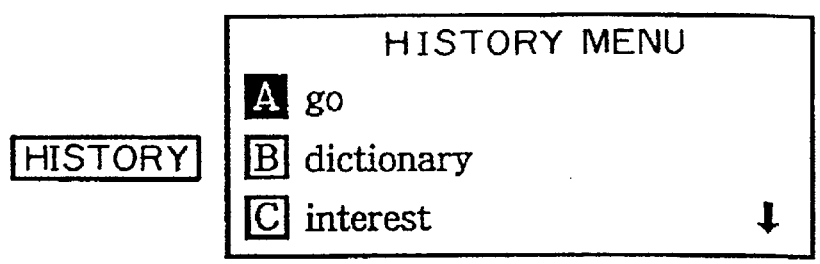
FIG. 8A is a plan view showing the display surface observed when selecting a history menu from the foregoing electronic dictionary.

FIGS. 8A to 8D are diagrams showing exemplary displays observed on display device 3 and are given for illustrating the history function. When history key 10 is operated, lists of English words as keyword information retrieved until the present time are displayed on the screen in the order of retrieval as shown in FIG. 8A. At this time, the item-specifying signs reversely displayed among those arranged on the left hand side of the screen as shown in FIG. 8A mean that the corresponding English words have already been registered in word memo area 13c. Therefore, any accidental problem of double registration can be eliminated in advance.

Figure 8B:
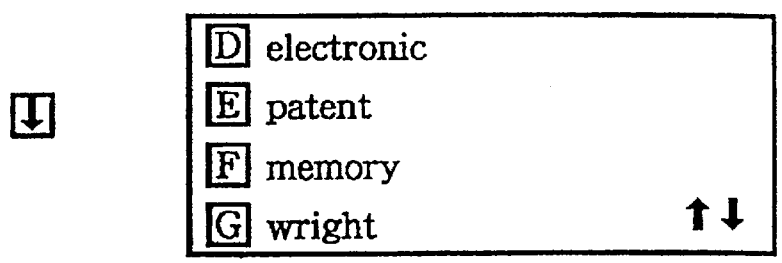
FIG. 8B is a plan view showing the display surface observed when invoking the next English word list from the foregoing history menu.
Figure 8C:
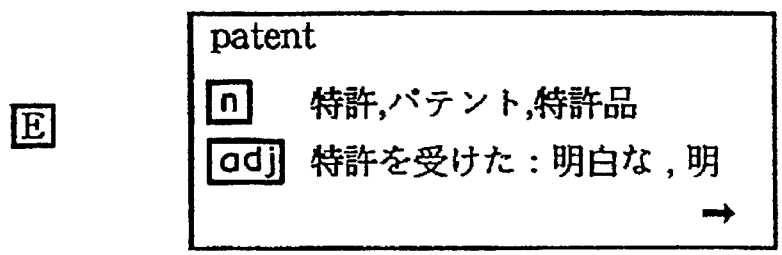
FIG. 8C is a plan view showing the display surface observed when an English word is selected from the English word list and the English word and the Japanese equivalent thereof are displayed thereon.
Figure 8D:
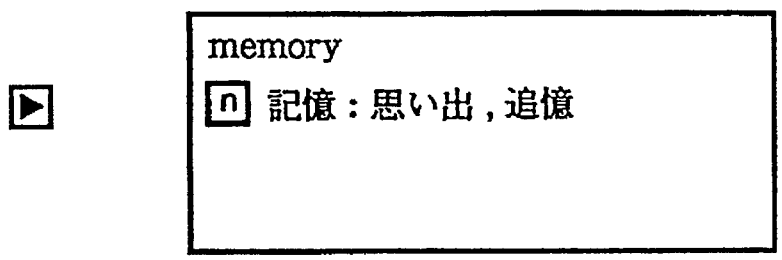
FIG. 8D is a plan view showing the display surface observed when the next English word is selected from the English word list and the English word and the Japanese equivalent thereof are displayed thereon.

If all of the English words retrieved till the present time cannot be displayed on the screen at the same time due to the limited capacity of the display surface or screen, any registered English words can be displayed on the screen by switching the screen through the action of cursor key 5c. FIG. 8B shows a condition of the display surface switched from one screen to another by the operation of cursor key 5c (a cursor directed downward). At this stage, if the operator wants to again confirm the Japanese equivalent of the keywords retrieved up to the present time, an item-specifying sign is selected through letter input key 4 and thus the dictionary retrieval is immediately performed. This permits elimination of any troublesome operations such that the keyword is again inputted. For instance, when the operator wants to confirm the Japanese equivalent for the English word "patent" shown in FIG. 8B, the English word "patent" and the corresponding Japanese equivalent are displayed on the screen if he operates [E] key among letter input keys 4 which is the key for specifying the item corresponding to the word "patent" (FIG. 8C). When NEXT key 8 is then operated, the English word "memory" retrieved subsequent thereto and the corresponding Japanese equivalent displayed as shown in FIG. 8D. Alternatively, when the operator wants to confirm the Japanese equivalent for another retrieved English word, the screen is switched to the history menu by the action of clear key 5b and then the foregoing operations are repeated.

The present invention permits the processing of direct word memo registration starting from the screen on which the history menu is displayed. The procedures for practicing this processing will be explained below with reference to FIGS. 9A to 9E.

Figure 9A:
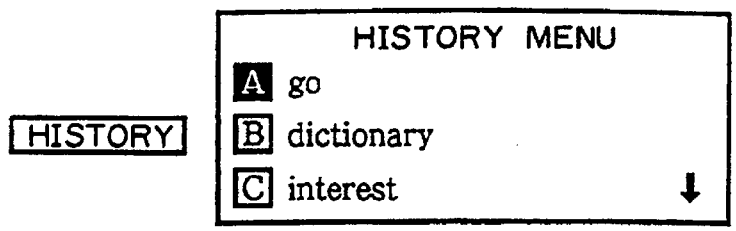
FIG. 9A is a plan view showing the display surface observed when the history menu is selected during the word memo registration operation.
Figure 9B:
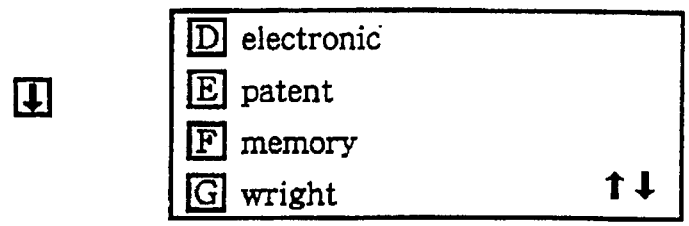
FIG. 9B is a plan view showing the display surface observed when the next keyword list in the foregoing history menu is displayed.

History key 10 is pushed down to output the screen displaying the history menu (FIG. 9A) and cursor key 5c is operated to select and output the keyword to be registered (FIG. 9B). In this respect, if an English word "electronic" is registered in word memo area 13c, [D] key among letter input keys 4 is pushed downward subsequent to the operation of registration key 7 to store the word "electronic" in word memo area 13c, simultaneously a message that the registration has been completed is displayed for a predetermined period of time (FIG. 9C) and the screen returns to that displaying the history menu (FIG. 9D). At this time, the item-specifying sign D is reversely displayed, which is indicative of the fact that the word "electronic" is registered in word memo area 13c. At this stage, if it is intended to again register the word "electronic", a message that the registration is duplicative is displayed over a predetermined period of time (FIG. 9E) and thereafter the screen returns the one as shown in FIG. 9D.

In this manner, any English word can easily be registered by outputting the screen displaying the history menu and then pushing down a letter key of letter input keys 4 corresponding to the item to be registered and simultaneously, any fruitless processing required for double registration can be avoided since the English words already registered are indicated by reversely displayed item-specifying signs. Moreover, when a retrieved English word is registered in word memo area 13c and history area 13d, the address information corresponding to the English word is registered. Therefore, when displaying the equivalent information through the use of the word memo function or the information concerning the English words already registered and displaying the corresponding equivalents through the use of the history function, each corresponding information can be extracted from dictionary data area 12b without repeating the retrieval of the keyword. This ensures quite efficient processing and allows the minimization of an increase in the memory capacity.

The foregoing processing procedures will be detailed below with reference to the flow charts shown in FIGS. 10 and 11.

Figure 10:
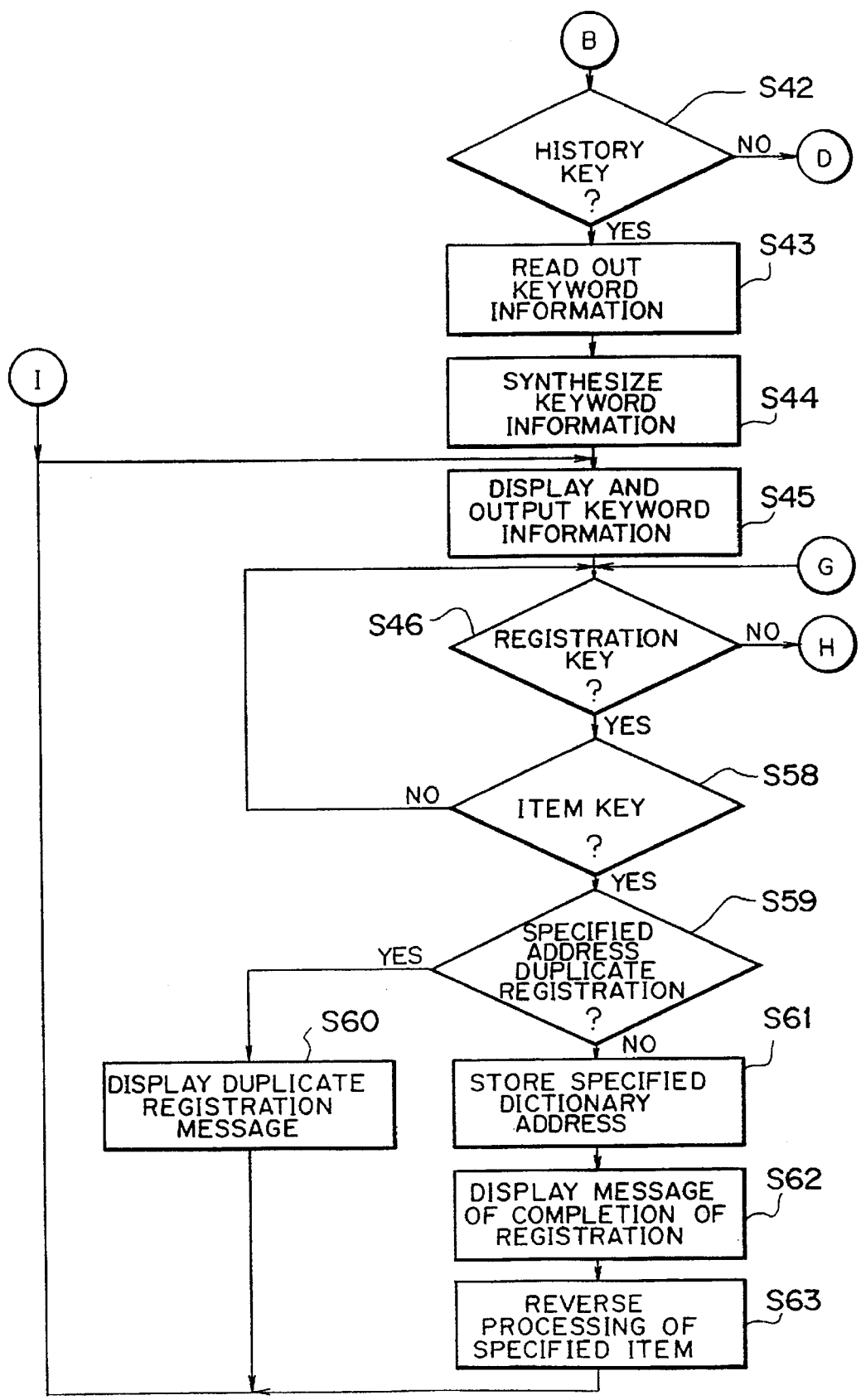
FIG. 10 is a flow chart illustrating the processing procedures for practicing the history function and the word memo function.
Figure 11:
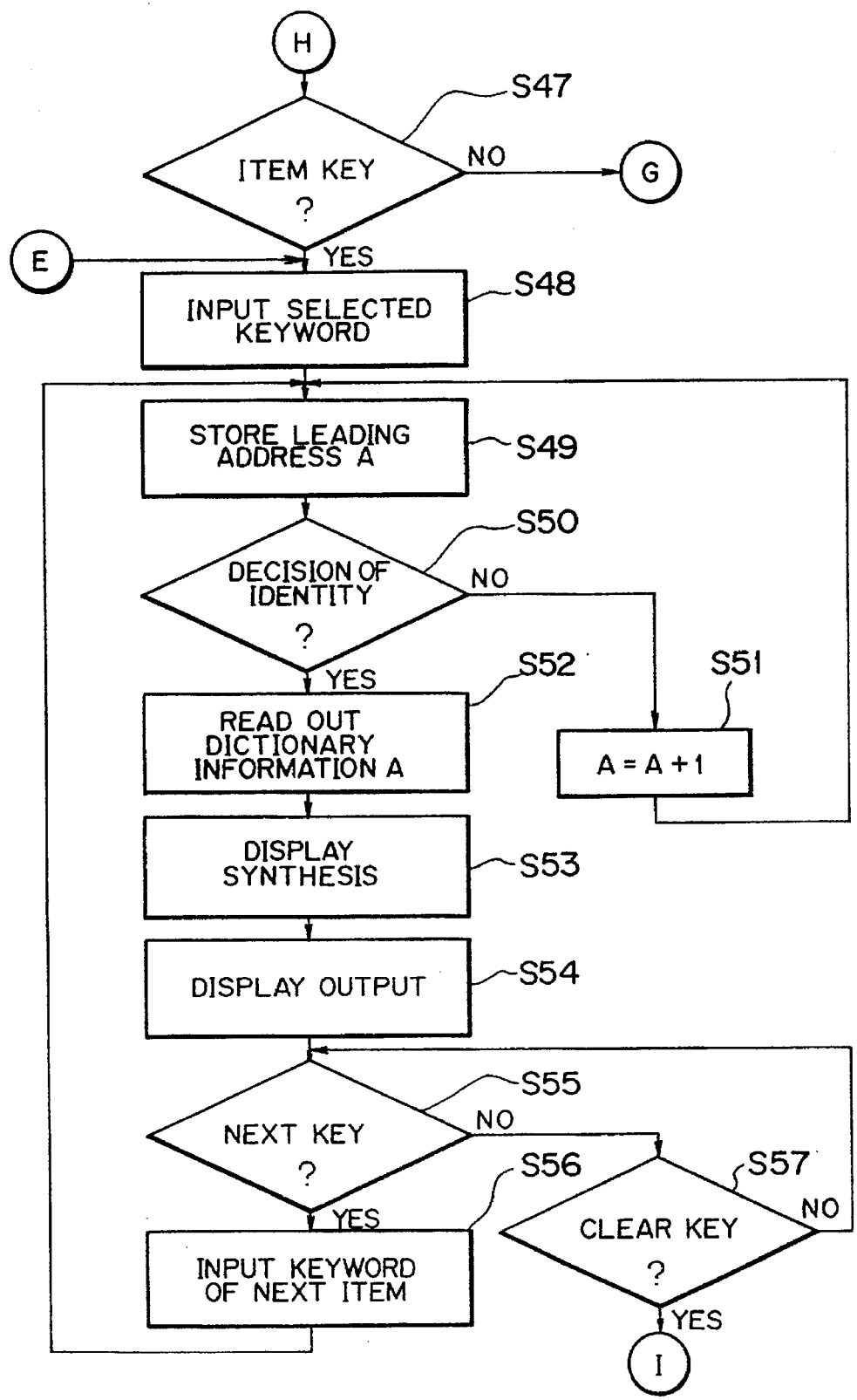
FIG. 11 is a flow chart illustrating the processing procedures for practicing the history function and the word memo function.

When word memo key 9 is not operated at step S16 shown in FIG. 6, the operation proceeds to step s42 as shown in FIG. 10 wherein it is confirmed whether history key 10 is operated or not. If history key 10 is operated, it proceeds to step S43. The keyword under retrieval stored in history area 13d of RAM 13 is read out at step S43 and synthesized into display information in display synthesis area 13b at step S44. At this stage, the keyword information stored in history area 13d comprises a character-string code constituting the keyword and an identification code indicative of the fact that the keyword is registered in word memo area 13c or that it is not registered therein. Thus, the item-specifying sign is displayed by an ordinary display or a reverse display depending on the identification code. The display data synthesized in step S44 are outputted and displayed on display device 3 in the form shown in FIG. 8A at step S45.

Then it is decided, at step S46, whether registration key 7 is operated or not. As a result of this decision, registration key 7 is not operated, the operation proceeds to the control through the ordinary history function, i.e., to step S47 and those subsequent thereto.

It is confirmed, at step S47, whether item-specifying key (letter-input key) 4 corresponding to the keyword under retrieval is operated or not and when it is not operated, the operation proceeds to step S46 shown in FIG. 10 and the electronic dictionary is in the state waiting for any input through registration key 7. If the foregoing item-specifying key 4 is operated, the corresponding keyword is inputted in work area 13a (step S48) and thereafter the same control operations performed at steps S3 to S8 (FIG. 4) are carried out at steps S49 to S54 to thus display the desired keyword and the corresponding Japanese equivalent.

Then it is decided, at step 55, whether NEXT key 9 is operated or not and when it is operated, a next keyword to be retrieved is inputted to work area 13a (a step S56) and then the retrieval and display operations of step S49 and those subsequent thereto are performed. When NEXT key 9 is not operated at step S55, the electronic dictionary proceeds to the operation at step S57 wherein it is confirmed whether clear key 5b is operated or not. As a result, when clear key 5b is operated, the dictionary returns to step S45 shown in FIG. 10 and the screen again displays the history menu. On the other hand, when clear key 5b is not operated, the dictionary returns to step S55 and is in the stand-by state till the next operation starts.

On the other hand, when it is found that registration key 7 has been operated, as a result of the decision on the existence of an input through the key at step S46 shown in FIG. 10, the dictionary proceeds to word memo registration processing, i.e., operations of step S58 and those subsequent thereto. It is decided, at step S58, whether item-specifying key (letter input key) 4 corresponding to the keyword to be registered is operated or not and when it is operated, the identification code associated with the specified keyword is confirmed (step S59). As a result, if it is found that the keyword has already been registered in the word, memo a message that the registration thereof is duplicative is outputted and displayed on display device 3 over a desired period of time and the screen is switched to that displaying the history menu (step S45).

If it is confirmed by the decision at step S59 that the keyword is not registered, an address which corresponds to the foregoing specified keyword is stored in word memo area 13c at step S61 and is included in dictionary data area 12b. At the same time, the identification code subsequent to the keyword in history area 13d is specified to be a registered one and a message that the registration of the keyword is finished is displayed on display device 3 at step S62. Then step S63 is performed, in which the item-specifying sign corresponding to the specified keyword is processed so that it is reversely displayed and the screen is switched to that displaying the history menu (step S45)

Embodiment 2

Embodiment 2 according to the present invention will now be explained below in detail while making reference to FIGS. 12A to 12F. FIGS. 12A to 12F show exemplary display surfaces of display device 3 and illustrating the practice of the word memo function while taking advantage of the history function according to embodiment 2.

In this Embodiment, when a plurality of keywords among those displayed on the screen which displays the history menu are registered in the word memo, those words are not registered one after another, but all of the keywords to be registered are first specified and then collectively registered, unlike Embodiment 1 wherein keywords to be registered among those displayed on the history menu displaying screen are registered one after another. Thus, this embodiment permits the substantial reduction in the number of operations required for registering a plurality of keywords and hence the reduction in the number of operation mistakes.

Embodiment 2 will be explained below with reference to FIG. 12.

Figure 12A:
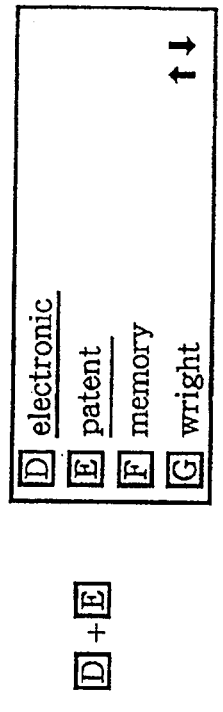
FIG. 12A is a plan view showing the display surface observed when a history menu is selected during the word memo operation of a second embodiment according to the present invention.
Figure 12B:
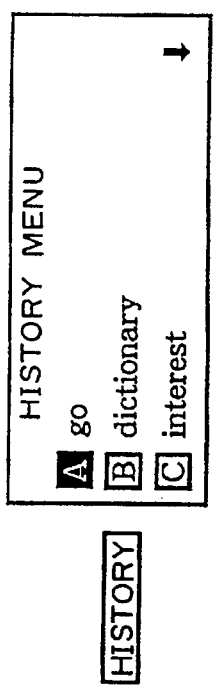
FIG. 12B is a plan view showing the display surface observed when the word memo mode is selected from the history menu.
Figure 12C:
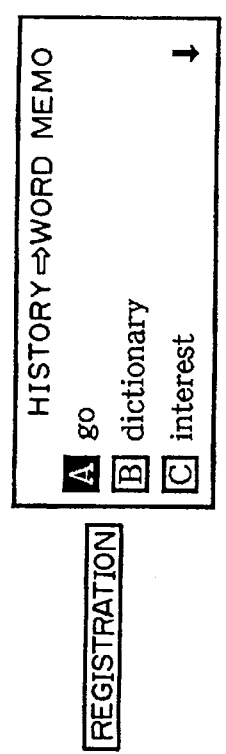
FIG. 12C is a plan view showing the display surface observed when instructing, in the word memo mode, the display of a new keyword list.
Figure 12D:
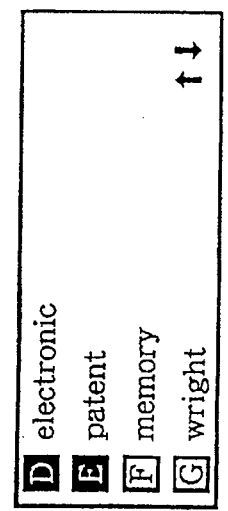
FIG. 12D is a plan view showing the display surface observed when two words to be registered are selected from the keyword list.

FIG. 12A is a diagram similar to FIG. 8A showing a screen displaying the history menu. When registration key 7 is operated in the state shown in this figure, a screen in the word memo registration mode is displayed (FIG. 12B). When any keyword to be registered is not found on the display surface, the screen is switched to another one by operating cursor key 5c (FIG. 12C). When words "electronic" and "patent" displayed on the screen shown in FIG. 12C are to be registered, the item-specifying sign corresponding to each keyword to be registered is inputted through letter input key 4 ("D" key or "F" key) to underline the specified keywords (FIG. 12D).

Figure 12E:
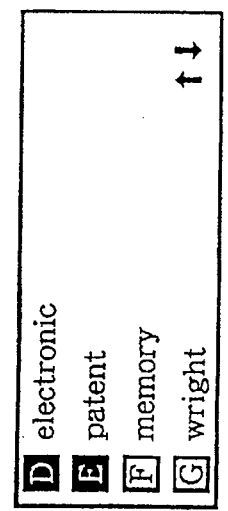
FIG. 12E is a plan view showing the display surface observed after the registration of the foregoing selected words.

When registration key 7 is operated at this stage, the specified English words are registered in word memo area 13c and simultaneously a message that the registration processing is completed is displayed on the screen over a predetermined period of time (FIG. 12E). Thereafter, the screen is switched to the history menu-displaying screen (FIG. 12F) and the item-specifying signs corresponding to those registered in word memo area 13c are outputted through reverse display.

Figure 13:
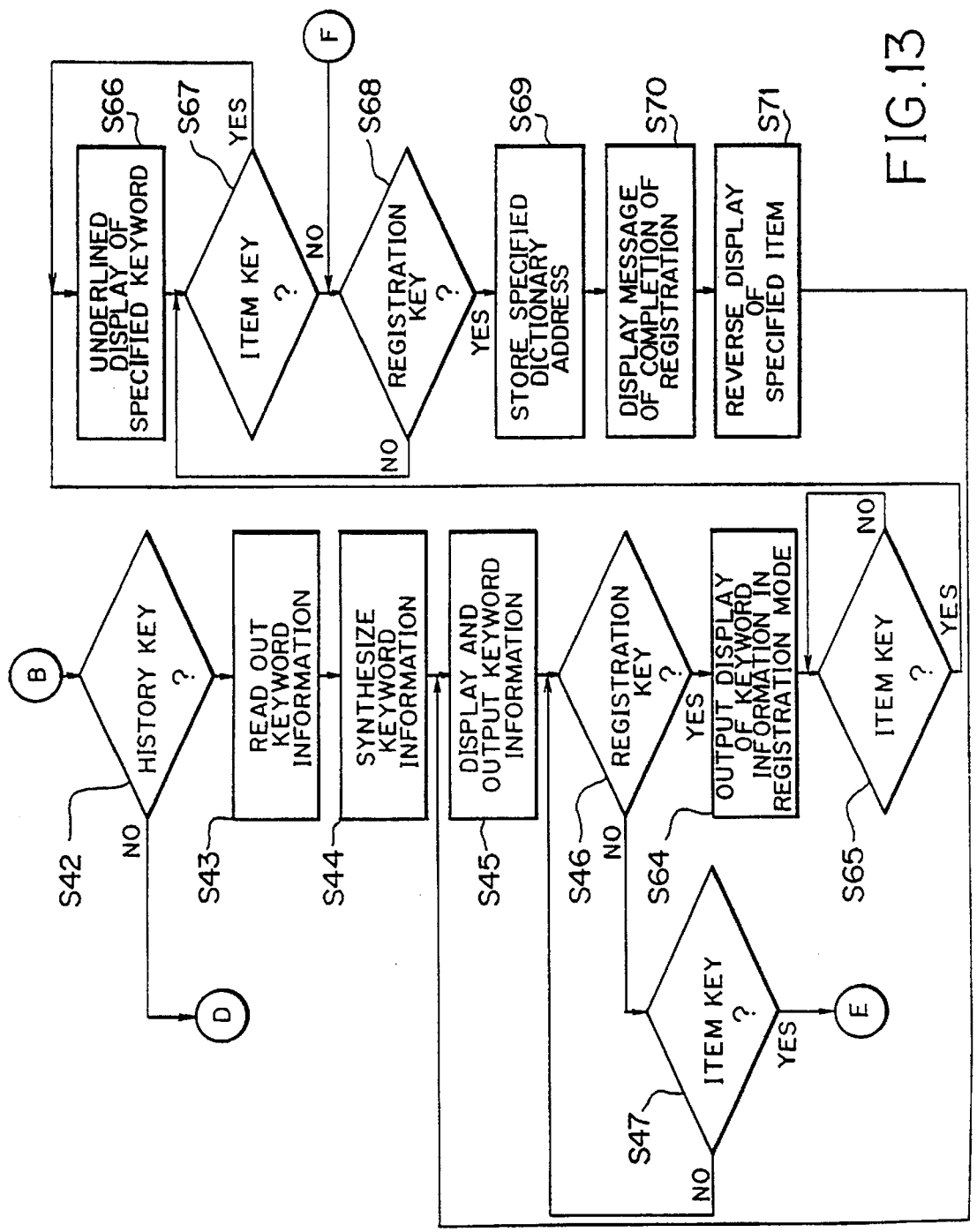
FIG. 13 is a flow chart illustrating the processing procedures for practicing the history function and the word memo function of the second embodiment according to the present invention.

Then the aforementioned control procedures will be detailed below with reference to the flow chart shown in FIG. 13. The control performed at steps S42 to S47 is identical to that effected at steps S42 to S47 already discussed in connection with FIG. 10 and FIG. 11 and, therefore, the details thereof are herein omitted.

Figure 12F:
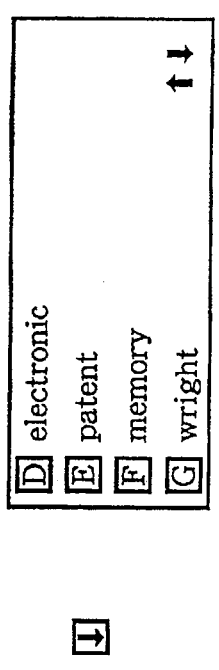
FIG. 12F is a plan view of the display surface displaying the history menu which is observed after the registration and in which the item sign for the registered word is accordingly reversely displayed.

When registration key 7 is operated at step S46 in the state wherein the history menu is displayed on the screen (FIG. 12A), the screen is switched to that in the word memo registration mode at step S64 (FIG. 12B). At this stage, the item-specifying signs corresponding to the keywords to be registered are selected by item-specifying key (letter input key) 4 (step S65) to underline the selected keywords at step 66. It is further confirmed the presence of other keywords to be registered or the existence of any operation of item-specifying key (letter input key) 4 and when such operation is performed, the foregoing step S66 is performed. When it is judged that there is not any other specified keyword at step S67, it is decided, at step S68, whether registration key 7 is operated or not. When registration key 7 is operated, an address is stored, at step S69, in word memo area 13c, which corresponds to the foregoing specified keyword and is included in dictionary data area 12b. At the same time, the identification code associated with the keyword in history area 13d is specified to be a registered one and a message that the registration of the keyword is finished is displayed on display device 3 at step S70. Then step S71 is performed, in which the item-specifying sign corresponding to the specified keyword is processed so that it is reversely displayed and the screen is switched to another one which displays the history menu at step S45 (FIG. 12F).

Embodiment 3

FIGS. 14A and 14B are diagrams showing exemplary display surface of display device 3 and are given for explaining embodiment 3 according to the present invention.

This embodiment permits the confirmation of the number of keywords registered in word memo area 13c by display device 3 unlike the foregoing Embodiment 1 and 2. Therefore, this embodiment allows effective use of word memo area 13c.

FIG. 14A shows that, when the screen in the word registration mode is on the display surface (FIG. 12C) and "D" key among letter input keys 4 is operated at this stage, the English word "electronic" is underlined and simultaneously the number of registered keywords of "20" is displayed on the screen.

Then "E" key among letter input keys 4 is operated to underline an English word "patent" and the number of registered keywords correspondingly increases from 20 to 21 (FIG. 14B).

The control procedures for this embodiment will be explained below while making reference to the flow chart shown in FIG. 15.

Figure 15:
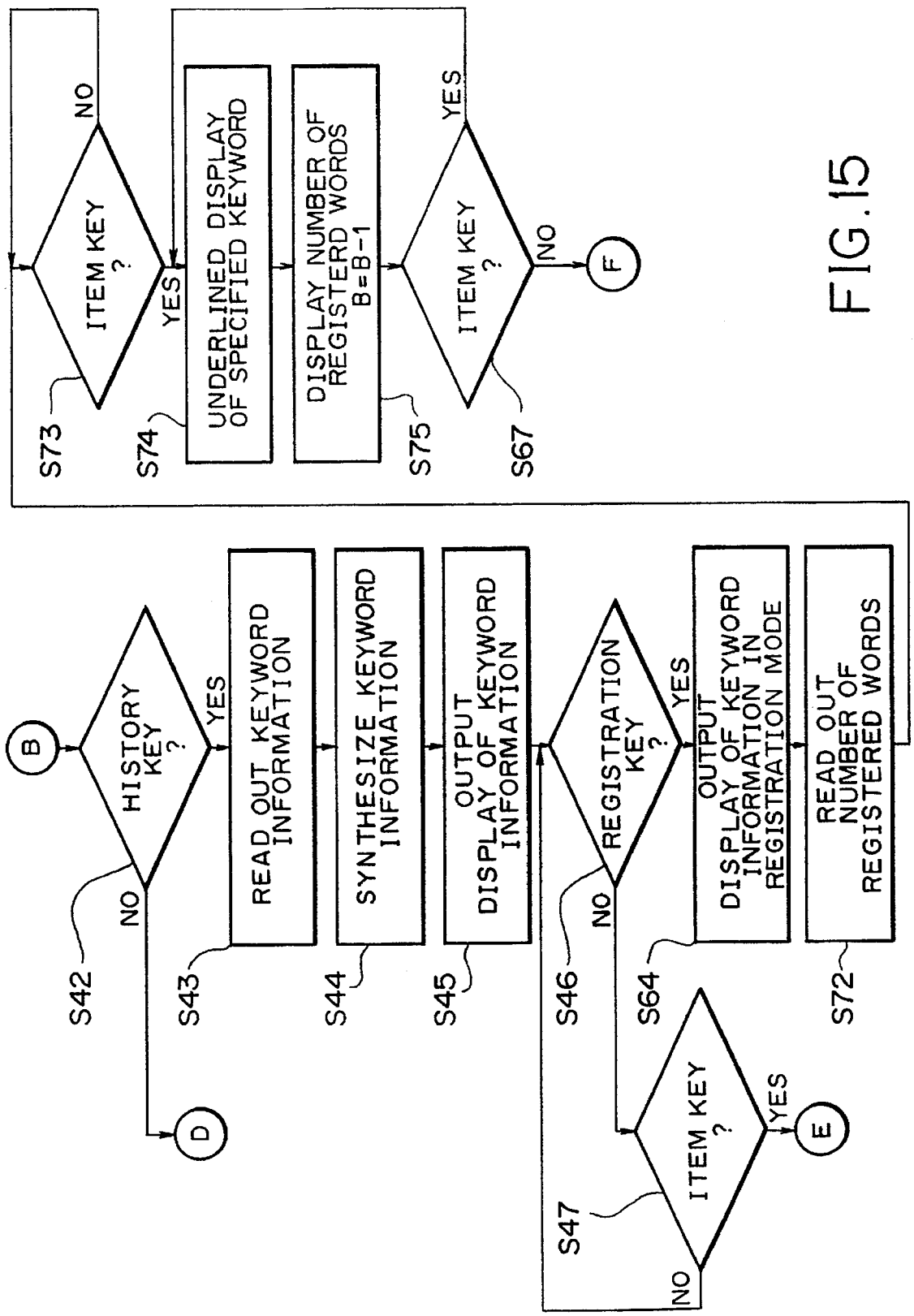
FIG. 15 is a flow chart illustrating the processing procedures for practicing the history function and the word memo function of the third embodiment according to the present invention.

Control procedures performed at steps S42 to S47 and step S64 shown in FIG. 15 are identical to those performed at steps S42 to S47 and step S64 discussed above in connection with FIG. 13 and accordingly, the details thereof are herein omitted.

In FIG. 15, when registration key 7 is operated at step 46, the screen in word memo registration mode is on the display surface at step S64, a count B, the number of presently registered keywords, is read out from word memo area 13c and inputted in work area 13a at step S72.

When item-specifying key (letter input key) 4 is then operated at step S73, the specified keyword is underlined (step S74), the number of registered keywords (count B) is increased by one (step S75), the count B is displayed on display device 3 and the electronic dictionary is in the state waiting for the operation of item-specifying key (letter input key) 4.

In this manner, the number of registered keywords can be confirmed each time a keyword is registered.

Figure 9C:
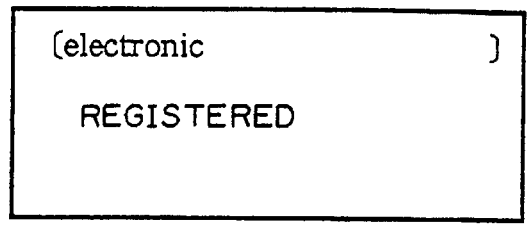
FIG. 9C is a plan view showing the display surface observed after one of the foregoing keywords is selected and registered.
Figure 9D:
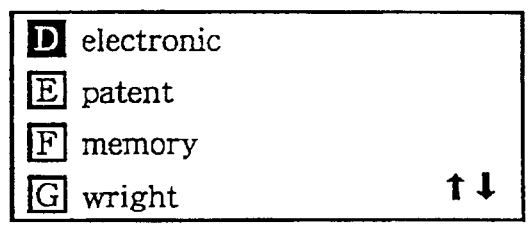
FIG. 9D is a plan view showing the display surface which indicates that a sign indicative of a certain keyword is reversely displayed in order to indicate the fact that it has already been registered.
Figure 9E:
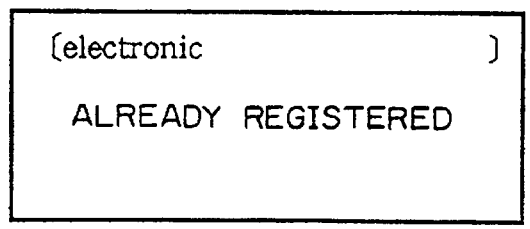
FIG. 9E is a plan view showing the display surface displaying a message of double registration observed when instructing the registration of the foregoing keyword already registered.

In Embodiments 1 and 2, the same effect achieved in this Embodiment can be anticipated if the dictionary is controlled so that the number of registered keywords is displayed during displaying a message that the word memo registration is completed (FIG. 9C and FIG. 12E).

The foregoing Embodiments 1 to 3 have been explained while taking an English-Japanese dictionary by way of example, by the present invention is by no means limited to English-Japanese dictionaries. The dictionary may be a Japanese dictionary or dictionaries for other foreign languages such as a French-Japanese dictionary and the desired effect of the present invention can likewise be anticipated in these cases.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An electronic dictionary comprising:

a dictionary memory for storing a dictionary comprising a first group of language information and a second group of language information corresponding to the first group of language information;

input means for inputting first language information;

instruction means for instructing said apparatus to retrieve the first language information;

retrieving means for searching the first group of language information stored in said dictionary memory for the first language information and retrieving the first language information in response to the instruction from said instruction means and retrieving second language information corresponding to the first language information from the second group of language information stored in said dictionary memory;

a history memory for storing the history of the result of the retrieval including the first language information retrieved by said retrieving means in response to each instruction by said instruction means;

display means for displaying the history of the result of the retrieval stored in said history memory;

selecting means for selecting at least one of the first language information displayed by said display means; and a register memory for storing the first language information selected by said selecting means.

2. The electronic dictionary as claimed in claim 1, further comprising means for preventing double-registration capable of displaying a message that the storage of the retrieved first language information is duplicative, when the retrieved first language information which has already been stored in register memory in again stored therein.

3. The electronic dictionary as claimed in claim 1, wherein, when storing the first language information inputted through said input means in said history memory and said register memory positional information for said dictionary memory is stored which is in correspondence to the first language information.

4. The electronic dictionary as claimed in claim 1, further comprising display-control means for determining the amount of the first language information stored in said register memory and for displaying the result when selecting the first language information stored in said history memory and storing the first language information in said register memory.

5. An electronic dictionary comprising:

a dictionary memory for storing a dictionary comprising a first group of language information and a second group of language information corresponding to the first group of language information;

input means for inputting first language information;

instruction means for instructing said dictionary to retrieve the first language information;

retrieving means for searching said first group of language information stored in said dictionary memory for first language information and retrieving the first language information and for retrieving second language information corresponding to the first language information from said second group of language information stored in said dictionary memory;

a history memory for storing the history of the result of retrieval including the first language information retrieved by said retrieving means, in response to every instruction by said instruction means;

display means for displaying the history of the result of the retrieval stored in said history memory;

selecting means for selecting at least one of the first language information displayed by said display means;

an register memory for storing the first language information selected by the selecting means.

6. A process for retrieving language information comprising:

an input step for inputting first language information;

instructing the retrieval of the first language information;

a retrieving step for searching and retrieving first language information and retrieving second language information corresponding to the first language information inputted in said input step from a dictionary memory storing first language information and second language information corresponding to the first language information in response to the instruction by said instruction step;

a first storing step for storing the history of the result of the retrieval including the first language information retrieved in said retrieving step, in response to every instruction from said instructing step;

a display step for displaying said history of the result of the retrieval stored in said first storing step;

a selecting step for selecting at least one of said first language information displayed in said display step; and a second storing step for storing said first language information selected in said selecting step.

7. An electronic apparatus comprising:

input means for inputting first language information;

a dictionary memory for storing a dictionary comprising first language information and second language information corresponding to the first language information;

instruction means for instructing said apparatus to retrieve the first language information;

retrieving means for searching and retrieving first language information inputted as the first language through said input means from a first group of language information in said dictionary memory and retrieving second language information corresponding to the first language information in said dictionary memory, in response to the instruction by said instruction means;

a history memory for storing the history of the result of the retrieval including the first language information retrieved by said retrieving means, in response to every instruction by said instruction means;

display means for displaying the history of result of the retrieval stored in said history memory;

selecting means for selecting at least one of the first language information displayed by said display means; and a register memory for storing the first language information selected by the selecting means.

8. The electronic dictionary as claimed in claim 5, further comprising display-control means for displaying the first language information stored in said history memory and for varying the display figures of the first language information stored in said register memory against the other first language information among said displayed first language information.

9. The electronic apparatus as claimed in claim 7, further comprising display-control means for displaying the first language information stored in said history memory and for varying the display figures of the first language information stored in said register memory against the other first language information among said displayed first language information.

10. The electronic apparatus as claimed in claim 7, further comprising means for displaying the first language information stored in said history memory and for selecting the plurality of displayed first language information and for storing the selected first language information in said register memory.

* * * * *

UNITED STATES PATENT AND TRADEMARK OFFICE
CERTIFICATE OF CORRECTION

PATENT NO. : 5,655,128
DATED : August 5, 1997
INVENTOR(S) : HIDEO FUSHIMOTO

It is certified that error appears in the above-indentified patent and that said Letters Patent is hereby corrected as shown below:

ON THE COVER PAGE
    At [56], U.S. PATENT DOCUMENTS
        Insert --5,136,504 8/1992 Fushimoto--.

At [56], FOREIGN PATENT DOCUMENTS
        "61156462 12/1986 Japan" should read --61-156462 12/1986 Japan--.

At [57], ABSTRACT
        Line 2, "a" should be deleted.

SHEET 4 OF DRAWINGS
    Figure 4, in Step S15, "REGISTERD" should read --REGISTERED--.

COLUMN 1
    Line 53, "that" should read --such that--.

COLUMN 2
    Line 7, "leads" should read --lead--.

COLUMN 3
    Line 32, "the-retrieval" should read --retrieval--.

COLUMN 5
    Line 31, "Embodiment" should read --embodiment--.
    Line 56, "will" should read --will be--.

UNITED STATES PATENT AND TRADEMARK OFFICE
CERTIFICATE OF CORRECTION

PATENT NO. : 5,655,128    Page 2 of 3
DATED : August 5, 1997
INVENTOR(S) : HIDEO FUSHIMOTO It is certified that error appears in the above-indentified patent and that said Letters Patent is hereby corrected as shown below:

COLUMN 6
    Line 3, "FIG." should read --FIGS.--
    Line 4, "executing" should read --executed--.

COLUMN 7
    Line 3, "in order read out" should read --read out in order--.
    Line 66, "are" shoud read --is--.

COLUMN 9
    Line 13, "proceeds" should read --performs--.

COLUMN 10
    Line 66, "s42" should read --S42--.

COLUMN 11
    Line 54, "word, memo" should read --word memo,--.

COLUMN 12
    Line 11, "embodiment 2." should read --Embodiment 2--.
    Line 12, "Embodiment," should read --embodiment,--; and "pluraliry" should read --plurality--.

UNITED STATES PATENT AND TRADEMARK OFFICE
CERTIFICATE OF CORRECTION

PATENT NO. : 5,655,128   Page 3 of 3
DATED :
INVENTOR(S) : August 5, 1997
HIDEO FUSHIMOTO It is certified that error appears in the above-indentified patent and that said Letters Patent is hereby corrected as shown below:

<u>COLUMN 13</u>
    Line 18, "Embodiment" should read --Embodiments--.
    Line 56, "Embodiment" should read --embodiment--.
    Line 62, "by" should read --but--.

<u>COLUMN 14</u>
    Line 43, "in" (second occurrence) should read --is--.

Line 47, "memory" should read --memory,--.

<u>COLUMN 15</u>
    Line 14, "an" should read --a--.

Signed and Sealed this

Twenty-fourth Day of March, 1998

Attest:

BRUCE LEHMAN

Attesting Officer    Commissioner of Patents and Trademarks